United States Patent
Venugopal et al.

(10) Patent No.: US 12,212,390 B2
(45) Date of Patent: Jan. 28, 2025

(54) JOINT PRECODING ACROSS MULTIPLE BEAMS

(71) Applicant: QUALCOMM Incorporated, San Diego, CA (US)

(72) Inventors: Kiran Venugopal, Green Brook, NJ (US); Wooseok Nam, San Diego, CA (US); Chenxi Hao, Beijing (CN); Tao Luo, San Diego, CA (US); Sungwoo Park, Seoul (KR); Fang Yuan, Beijing (CN); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/758,488

(22) PCT Filed: Feb. 14, 2020

(86) PCT No.: PCT/CN2020/075313
§ 371 (c)(1),
(2) Date: Jul. 7, 2022

(87) PCT Pub. No.: WO2021/159481
PCT Pub. Date: Aug. 19, 2021

(65) Prior Publication Data
US 2023/0027718 A1  Jan. 26, 2023

(51) Int. Cl.
*H04B 7/06* (2006.01)
*H04L 5/00* (2006.01)

(52) U.S. Cl.
CPC .......... *H04B 7/0617* (2013.01); *H04B 7/063* (2013.01); *H04B 7/0632* (2013.01); *H04L 5/0051* (2013.01)

(58) Field of Classification Search
CPC ..... H04B 7/0617; H04B 7/063; H04B 7/0632
(Continued)

(56) References Cited

U.S. PATENT DOCUMENTS 11,316,626 B2 *  4/2022  Park .................. H04L 5/0055
11,864,038 B2 *  1/2024  Ingale ............... H04W 74/0833
(Continued)

FOREIGN PATENT DOCUMENTS

| WO | 2018031825 A1 | 2/2018 | |
|----|---------------|--------|----|
| WO | WO-2018171604 A1 * | 9/2018 | .......... H04B 7/0469 |
| WO | WO-2018174609 A2 * | 9/2018 | ............. H04L 5/005 |
| WO | WO-2019059700 A1 * | 3/2019 | .......... H04L 1/0057 |

(Continued)

OTHER PUBLICATIONS

Huawei, et al., "Beam Measurement, Reporting and Indication", 3GPP TSG RAN WG1 Meeting #91, R1-1719422, Reno, USA, Nov. 27-Dec. 1, 2017, Dec. 1, 2017 (Dec. 1, 2017), 11 Pages, the whole document.

(Continued)

*Primary Examiner* — Leila Malek
(74) *Attorney, Agent, or Firm* — Kevin M. Donnelly; Patterson & Sheridan LLP

(57) ABSTRACT

One innovative aspect of the subject matter described in this disclosure can be implemented in a method for wireless communication. The method includes determining a configuration of reference signal (RS) resources to be used by a user-equipment (UE) to perform beam measurements, transmitting, to the UE, an indication of the configuration of the RS resources, and receiving, from the UE, a report indicating a plurality of RS resource indicators based on the beam measurements, each of the RS resource indicators being associated with one of the RS resources. In some aspects, the BS selects a subset of the RS resources based on the report from the UE, transmits, to the UE, an indication to provide channel measurement information for the subset of the RS resources, and receives a report including the channel measurement information from the UE. The BS may also perform joint precoding of signals for transmission via (Continued)

the RS resources based on the channel measurement information.

38 Claims, 8 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2018/0287683 A1* | 10/2018 | Subramanian | H04B 7/0643 |
| 2018/0288645 A1* | 10/2018 | Lee | H04B 17/382 |
| 2020/0036425 A1 | 1/2020 | Ren et al. | |
| 2021/0226689 A1* | 7/2021 | Farag | H04W 24/10 |

FOREIGN PATENT DOCUMENTS

| | | | | |
|---|---|---|---|---|
| WO | WO-2020019959 A1 * | 1/2020 | ........... | H04B 17/345 |
| WO | WO-2020228971 A1 * | 11/2020 | ........... | H04B 17/336 |

OTHER PUBLICATIONS

Intel Corporation: "Discussion on CSI Feedback for NR", 3GPP TSG-RAN WG1 #86, R1-167129, Discussion on CSI Feedback for NR R4, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 22, 2016-Aug. 26, 2016, 2016, Aug. 21, 2016 (Aug. 21, 2016), XP051140544, 3 pages, Retrieved from the Internet: URL: http://www.3gpp.org/ftp/Meetings_3GPP_SYNC/RAN1/Docs/ [retrieved on Aug. 21, 2016], section 3.
International Search Report and Written Opinion—PCT/CN2020/075313—ISAEPO—Nov. 25, 2020.
Qualcomm Incorporated: "On Type I and Type II CSI Parameters Encoding", 3GPP TSG RAN WG1 #90, R1-1713397, Aug. 21-25, 2017, Prague, Czech, Aug. 25, 2017 (Aug. 25, 2017), pp. 1-5, the whole document.
ZTE: "CSI Enhancement for MU-MIMO Support", 3GPP TSG RAN WG1 Meeting #98bis, R1-1910283, Chongqing, China, Oct. 14-20, 2019, 9 Pages.
NTT DOCOMO: "Views on NR Beam Management", R1-1720803, 3GPP TSG RAN WG1 Meeting #91, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370232, 11 Pages, p. 3, Figure 3, 3. General procedure for DL beam Management, 4. Reference signal for DL beam management, sections 3-6; pp. 2-8.
Supplementary European Search Report—EP20919017—Search Authority—Munich—Sep. 27, 2023.

* cited by examiner

JOINT PRECODING ACROSS MULTIPLE BEAMS

CROSS-REFERENCE TO RELATED APPLICATIONS

This application is a national stage application under 35 U.S.C. 371 of PCT/CN2020/075313, filed Feb. 14, 2020, which is hereby expressly incorporated by reference herein in its entirety as if fully set forth below and for all applicable purposes.

TECHNICAL FIELD

Aspects of the present disclosure relate generally to wireless communication, and more particularly, to techniques for signal precoding.

DESCRIPTION OF RELATED TECHNOLOGY

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO), and carrier aggregation.

A base station (BS) and a user equipment (UE) may each perform operations for beam training, selection and refinement. For example, a BS may transmit a channel state information (CSI)-reference signal (RS) or a synchronization signal block (SSB) that may be used for selecting analog beams. Further refinement of the beam may be accomplished via additional reference signals (RSs). Additionally, in some examples, a BS may request that a UE provide precoding information to the BS for one or more selected beams, enabling the BS to increase communication performance.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved precoding operations.

One innovative aspect of the subject matter described in this disclosure can be implemented in a method for wireless communication. The method includes determining a configuration of reference signal (RS) resources to be used by a user-equipment (UE) to perform beam measurements, transmitting, to the UE, an indication of the configuration of the RS resources, receiving, from the UE, a report indicating a plurality of RS resource indicators based on the beam measurements, each of the RS resource indicators being associated with one of the RS resources, selecting a subset of the RS resources based on the report from the UE, transmitting, to the UE, an indication to provide channel measurement information for the subset of the RS resources, receiving a report including the channel measurement information from the UE, and performing joint precoding of signals for transmission via the RS resources based on the channel measurement information.

One innovative aspect of the subject matter described in this disclosure can be implemented in a method for wireless communication. The method includes receiving an indication of a configuration of reference signal (RS) resources, performing beam measurements using the RS resources, transmitting a report indicating a plurality of RS resource indicators based on the beam measurements, each of the RS resource indicators being associated with one of the RS resources, receiving an indication to provide channel measurement information for a subset of the RS resources, performing channel measurement based on the subset of the RS resources to generate the channel measurement information, and transmitting a report including the channel measurement information to be used for joint precoding.

One innovative aspect of the subject matter described in this disclosure can be implemented in an apparatus for wireless communication. The apparatus generally includes a processing system configured to determine a configuration of reference signal (RS) resources to be used by a user-equipment (UE) to perform beam measurements, a transmitter configured to transmit, to the UE, an indication of the configuration of the RS resources, and a receiver configured to receive, from the UE, a report indicating a plurality of RS resource indicators based on the beam measurements, each of the RS resource indicators being associated with one of the RS resources, wherein the processing system is further configured to select a subset of the RS resources based on the report from the UE, and wherein the transmitter is further configured to transmit, to the UE, an indication to provide channel measurement information for the subset of the RS resources, wherein the receiver is further configured to receive a report including the channel measurement information from the UE, wherein the processing system is further configured to perform joint precoding of signals for transmission via the RS resources based on the channel measurement information.

One innovative aspect of the subject matter described in this disclosure can be implemented in an apparatus for wireless communication. The apparatus generally includes a receiver configured to receive an indication of a configuration of reference signal (RS) resources, a processing system configured to perform beam measurements using the RS resources, and a transmitter configured to transmit a report indicating a plurality of RS resource indicators based on the beam measurements, each of the RS resource indicators being associated with one of the RS resources, wherein the receiver is further configured to receive an indication to provide channel measurement information for a subset of the RS resources, wherein the processing system is further configured to perform channel measurement based on the subset of the RS resources to generate the channel measurement information, and wherein the transmitter is further configured to transmit a report including the channel measurement information to be used for joint precoding.

One innovative aspect of the subject matter described in this disclosure can be implemented in an apparatus for wireless communication. The apparatus generally includes means for determining a configuration of reference signal (RS) resources to be used by a user-equipment (UE) to perform beam measurements, means for transmitting, to the UE, an indication of the configuration of the RS resources, means for receiving, from the UE, a report indicating a plurality of RS resource indicators based on the beam measurements, each of the RS resource indicators being associated with one of the RS resources, means for selecting a subset of the RS resources based on the report from the UE, means for transmitting, to the UE, an indication to provide channel measurement information for the subset of the RS resources, means for receiving a report including the channel measurement information from the UE, and means for performing joint precoding of signals for transmission via the RS resources based on the channel measurement information.

One innovative aspect of the subject matter described in this disclosure can be implemented in an apparatus for wireless communication. The apparatus generally includes means for receiving an indication of a configuration of reference signal (RS) resources, means for performing beam measurements using the RS resources, means for transmitting a report indicating a plurality of RS resource indicators based on the beam measurements, each of the RS resource indicators being associated with one of the RS resources, means for receiving an indication to provide channel measurement information for a subset of the RS resources, means for performing channel measurement based on the subset of the RS resources to generate the channel measurement information, and means for transmitting a report including the channel measurement information to be used for joint precoding.

Aspects of the present disclosure provide means for, apparatus, processors, and computer-readable mediums for performing the methods described herein.

To the accomplishment of the foregoing and related ends, the one or more aspects include the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only some typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
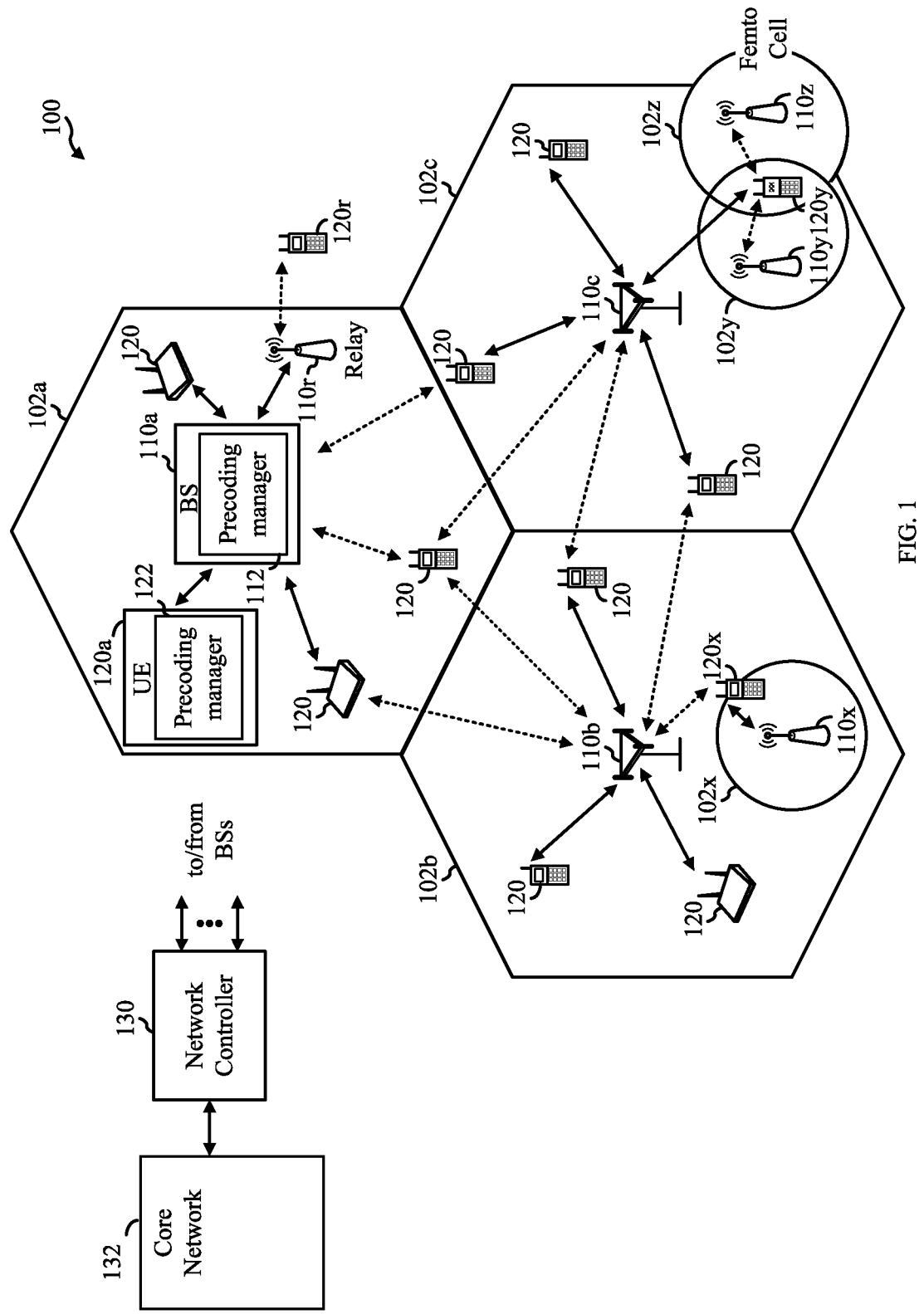
FIG. 1 illustrates an example wireless communication network in which aspects of the present disclosure may be performed.

Aspects of the present disclosure provide apparatus, methods, processing systems, and computer readable mediums for joint precoding. In some aspects, a BS may configure a user-equipment (UE) to report beam measurement information, such as a reference signal received power (RSRP) or a signal-to-interference-plus-noise ratio (SINR), for each of a configurable number of beams. In some cases, the configurable number of beams may correspond to beams the UE is capable of receiving simultaneously. After the UE reports the beam measurement information to the BS, the BS may select a subset of the beams reported by the UE, and request further channel measurement information to be reported for the subset of beams for further beam refinement. For example, the UE may report a pre-coding matrix indicator (PMI), channel quality information, a rank indicator (RI), or any combination thereof, for each of the subset of beams. The reported channel measurement information may be used by the BS to perform joint precoding of signals for transmission via the subset of beams.

The following description provides examples of joint precoding operations in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (for example, 5G NR) wireless technologies, aspects of the present disclosure can be applied in other generation-based communication systems.

NR access may support various wireless communication services, such as enhanced mobile broadband (eMBB) targeting wide bandwidth (for example, 80 MHz or beyond), millimeter wave (mmW) targeting high carrier frequency (for example, 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams (rank-2) per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (for example, a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (for example, via a backhaul).

The BSs 110 communicate with UEs 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile. Wireless communication network 100 may also include relay stations (for example, relay station 110r), also referred to as relays or the like, that receive a transmission of data and/or other information from an upstream station (for example, a BS 110a or a UE 120r) and sends a transmission of the data and/or other information to a downstream station (for example, a UE 120 or a BS 110), or that relays transmissions between UEs 120, to facilitate communication between devices.

According to some aspects, the BSs 110 and UEs 120 may be configured for joint precoding. As shown in FIG. 1, the BS 110a includes a precoding manager 112. The precoding manager 112 may be configured to receive a report including channel measurement information for a configurable number of beams to be used for joint precoding, in accordance with aspects of the present disclosure. As shown in FIG. 1, the UE 120a includes a precoding manager 122. The precoding manager 122 may be configured to transmit a report including channel measurement information for a configurable number of beams to be used for joint precoding, in accordance with aspects of the present disclosure.

Figure 2:
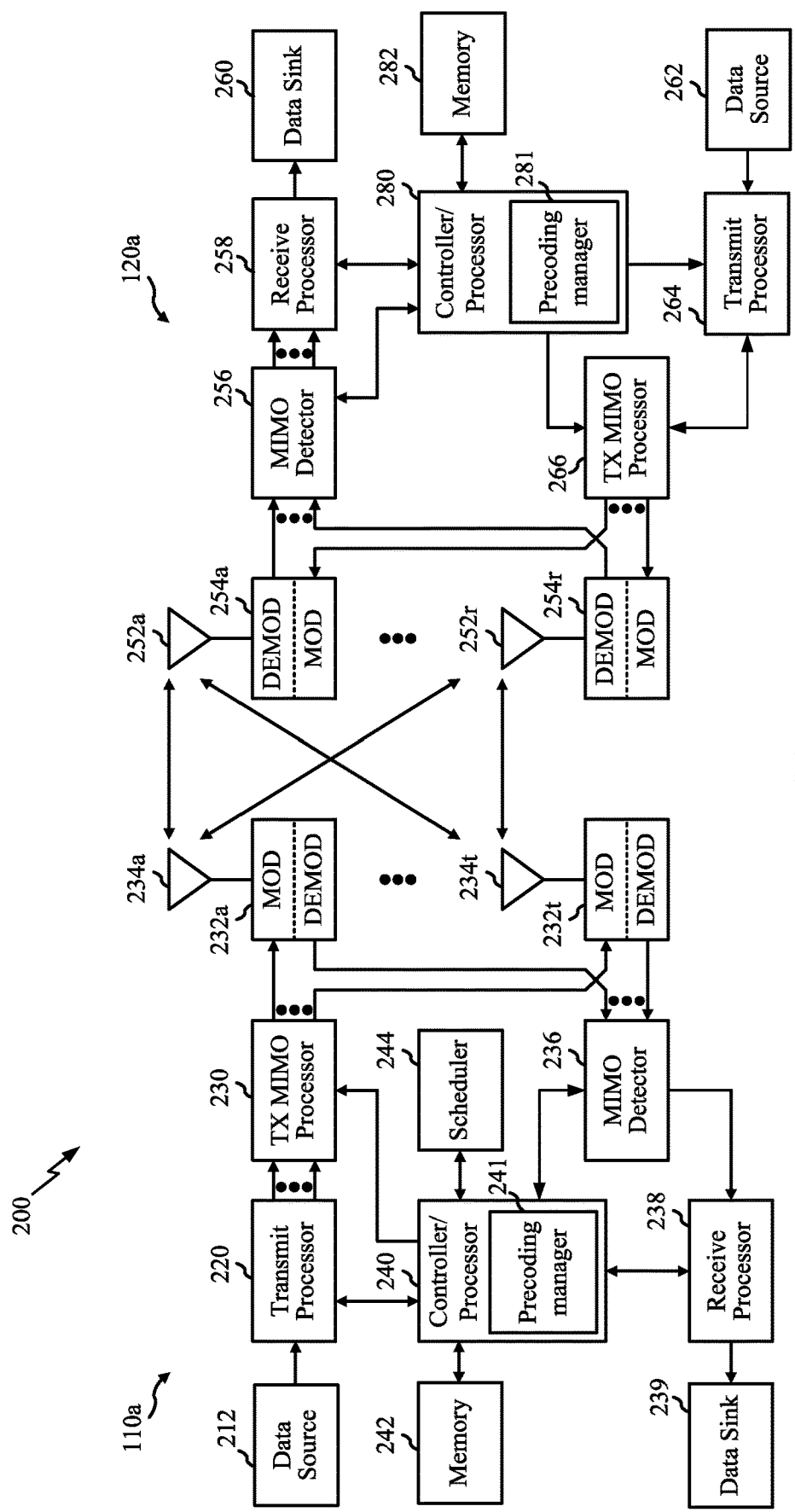
FIG. 2 illustrates example components of base station (BS) and user-equipment (UE), which may be used to implement aspects of the present disclosure.

FIG. 2 illustrates example components of BS 110a and UE 120a (for example, in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (for example, precoding) on the data symbols, the control symbols, and/or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the modulators in transceivers 254a-254r (for example, for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a precoding manager 241 that may be configured to receive a report including channel measurement information for a configurable number of beams to be used for joint precoding, according to aspects described herein. As shown in FIG. 2, the controller/processor 280 of the UE 120a has a precoding manager 281 that may be configured to transmit a report including channel measurement information for a configurable number of beams to be used for joint precoding, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (for example, 30 kHz, 60 kHz, 120 kHz, 240 kHz, etc.).

Example Joint Precoding Across Multiple Beams

A BS may apply precoding over channel state information (CSI)-reference signal (RS) ports associated with a CSI-RS resource indicator (CRI) reported by a UE, based on a pre-coding matrix indicator (PMI) or rank indicator (RI) also reported by the UE. A BS may select a single beam for communication based on the CRI report. In some aspects, a UE may report multiple CRIs to enable the BS to perform joint precoding across multiple beams to facilitate simultaneous multi-beam transmission or reception. For example, the UE may report multiple CRIs in a single CSI report when group-based beam reporting is enabled, as described in more detail herein.

In some aspects, a BS may transmit a configuration of multiple CSI-RS resources for use in performing channel measurements within a resource set. A BS may select at least one CSI-RS resource based on a CRI reported by the UE, the at least one CSI-RS resource to be used for further beam refinement. The BS may also transmit an indication to the UE to report precoding information to the BS. In some aspects, the UE may report joint CQI, PMI and RI for multiple CSI-RS resources, instead of selecting one CSI-RS resource and reporting the precoding information for the selected CSI-RS resource on an individual basis. Additionally, port selection may be performed within a CSI-RS resource. For example, a CSI-RS resource may be associated with one or more ports, and a subset of the ports may be selected by a UE and reported to the BS, as described in more detail herein. The base station may assume all aggregated ports of different CSI-RS resources are jointly precoded. While some examples provided herein are described with respect to CSI-RS to facilitate understanding, the aspects described herein may be applied using a synchronization signal block (SSB) or any combination of CSI-RS and SSB.

Figure 3:
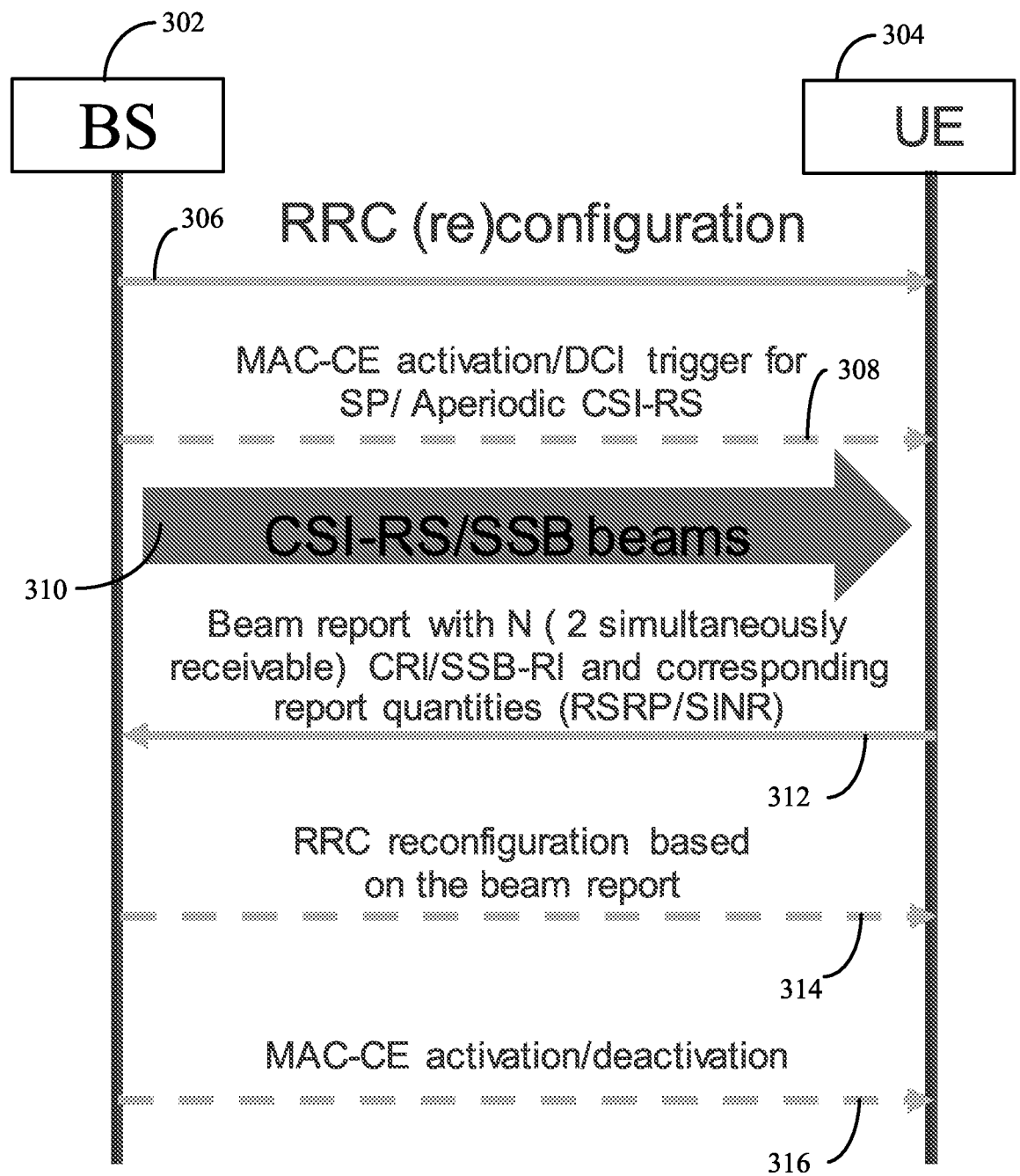
FIG. 3 illustrates a reporting framework, in accordance with some aspects of the present disclosure.

FIG. 3 illustrates a reporting framework, in accordance with some aspects of the present disclosure. As illustrated, a base station (BS) 302 may transmit an RRC configuration 306 (or reconfiguration) to a UE 304. For example, the BS may use RRC information elements to configure downlink (DL) resources for CSI-RS or SSB. The RRC information elements may indicate, for example, the time instances where the resources occur, what beam measurements are to be performed by the UE 304, and when the UE is to report the measurements. In some implementations, the BS 302 may also transmit a message 308 including a medium access control (MAC)-control element (CE) activation or downlink control information (DCI) trigger for semi persistent (SP) or aperiodic CSI-RS or SSB. As illustrated, the UE 304 may receive CSI-RS or SSB beams 310 for performing beam measurements. The UE 304 may then transmit a beam report 312 with N CSI-RS resource indicators (CRIs) or SSB-resource indicators (SSB-RIs), and corresponding report quantities such as a reference signal received power (RSRP) or a signal-to-interference-plus-noise ratio (SINR) associated with each of the reported beams. In some cases, the N CRIs or SSB-RIs may correspond to beams that the UE is able to receive simultaneously. In other words, the BS 302 may configure the UE 304 to report on multiple beams (for example, the top N beams) within the same message. For example, the UE may report an RSRP for beam 1 and an RSRP for beam 2, and in some examples, RSRPs for additional associated beams up to beam N.

In some implementations, if a UE 304 is configured with a higher layer parameter (for example, a group-based beam reporting parameter) set to 'disabled', the UE may not update measurements for more than 64 CSI-RS or SSB resources, and the UE may send a single report having a quantity N different CRIs or a quantity N different SSB-RIs for each report setting. If the UE is configured with the higher layer parameter (for example, the group-based beam reporting parameter) set to 'enabled', the UE may not update measurements for more than 64 CSI-RS or SSB resources, and the UE may report, in a single reporting instance, two different CRIs or SSB-RIs for each report setting. However, when group-based beam reporting parameter is enabled, the CSI-RS or SSB resources correspond to resources that the UE is capable of receiving simultaneously either with a single spatial domain receive filter, or with multiple simultaneous spatial domain receive filters. Based on the report, the BS 302 may perform further actions to allocate resources or may perform operations for beam refinement. For example, in order to allocate resources for communication, the BS 302 may transmit an RRC reconfiguration message 314 based on the beam report 312 (for example, configuring transmission configuration indicator (TCI)-states), as well as a MAC-CE activation or deactivation message 316 (for example, activating a subset of the TCI-states).

In some example in which the beam report from the UE 304 includes CRI information, the BS 302 may configure the UE to report more information useful for determining the precoding to be applied to signals for communication with the UE. For example, the BS 302 may configure RS resources and request that the UE report a PMI, a CQI, or an RI, or any combination thereof, based on the CSI-RS or SSB resources. The UE may receive transmissions via RS resources and ports that the BS configures, and report additional channel state information to improve communication performance.

Figure 4A:
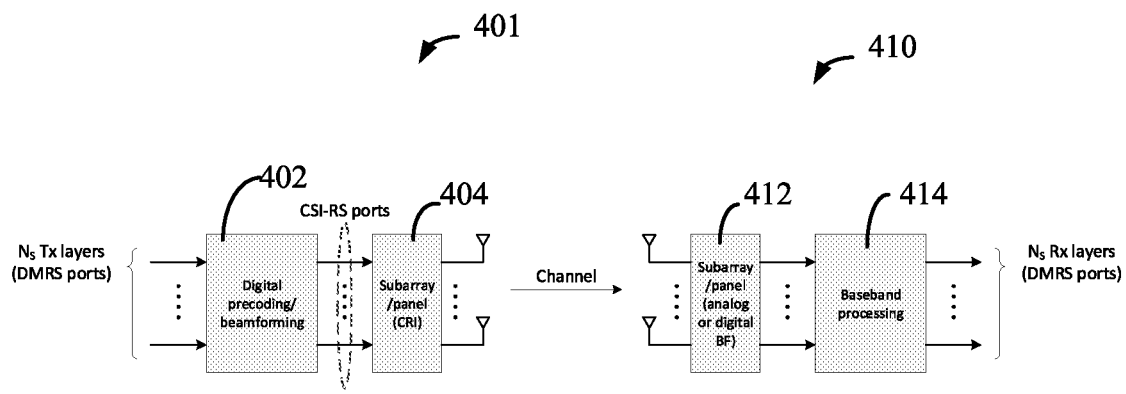
FIGS. 4A and 4B illustrate communication systems using digital precoding.
Figure 4B:
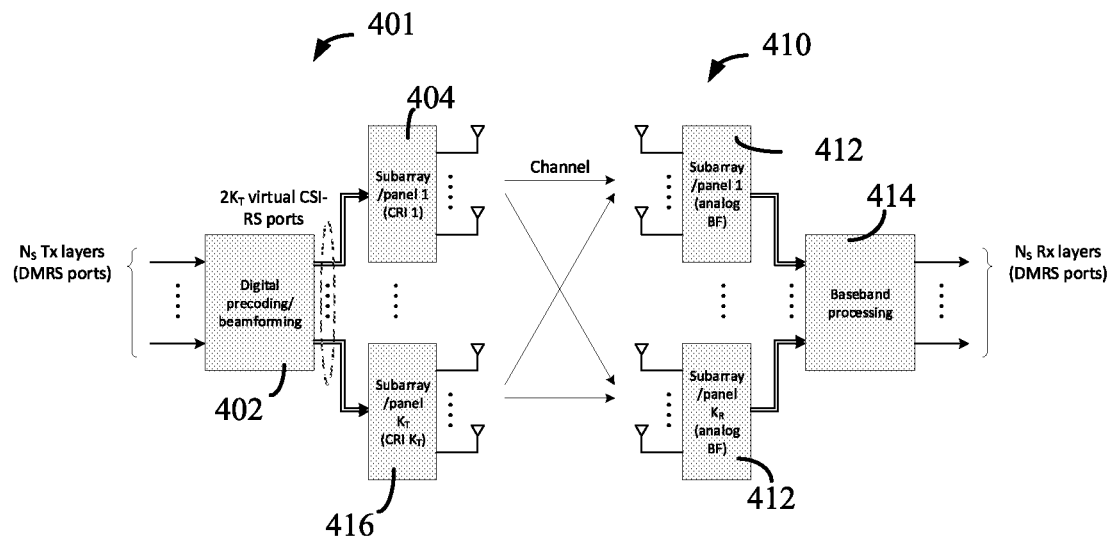

FIGS. 4A and 4B illustrate example communication systems configured to perform digital precoding of signals for transmission from a BS 401 to a UE 410. The communication system of FIG. 4A may be configured for single beam communication (for example, using a Type I single panel). As illustrated in FIG. 4A, the BS 401 may include a digital precoding and beamforming module 402 having inputs configured to receive transmission layer signals (for example, via demodulation RS (DMRS) ports). The output of the digital precoding and beamforming module 402 may include CSI-RS ports coupled to inputs of a subarray 404 used for transmission over the wireless channel. Similarly, a UE 410 may include a subarray 412 for analog or digital beamforming and a baseband module 414 for digital processing of signals. In some examples, the BS 401 may select a single beam, and in some examples also select one or more surrounding beams, based on a CRI report received from the UE 410, as described herein. A beam may refer to a digital beam (for example, using an oversampled discrete Fourier transform (DFT) codebook) using up to 32 CSI-RS ports. In some examples, precoding may include co-phasing and combining over different beams and polarizations. The BS 401 may apply precoding over CSI-RS ports associated with the reported CRI, based on a PMI or an RI reported by the UE 410.

As illustrated in FIG. 4B, multiple subarrays (for example, subarrays 404 and 416) may be implemented for CRI 1 to CRI $K_T$, $K_T$ representing the quantity of CRIs (for example, beams). As illustrated, each CRI may be associated with two ports, resulting in $2K_T$ virtual ports. In addition, each CRI may be associated with different TCI states. The BS may aggregate CSI-RS ports from multiple CRIs to form a pool of virtual CSI-RS ports. The multiple CRIs may or may not be surrounding or neighboring beams. The BS may perform precoding to increase the effective precoding dimension for communication with the UE. As illustrated, the UE 410 may also include multiple subarrays 412 and 518 for reception of signals associated with the multiple CRIs.

As described herein, the UE 410 may report the multiple CRIs in a single report. The BS 401 may configure the UE 410 to indicate the multiple CRIs associated with the CSI-RS resources in a report, allowing the BS to pool the one or more ports associated with each of the CSI-RS resources for joint precoding of the ports across the CSI-RS resources. For example, the BS 401 may perform joint precoding for the $2K_T$ virtual ports, as illustrated in FIG. 4B.

In some aspects, a UE 410 may transmit a single beam report having multiple CRIs when group-based beam reporting is enabled. In other words, the UE may report multiple CRIs in a single CSI report, based on which, the BS may configure joint active TCI states (for example, by MAC CE) associated with the multiple CRIs reported by the UE. The TCI states, each having QCL-Type D (for example, spatial quasi-co location) configuration, may be mapped to a single codepoint.

Figure 5:
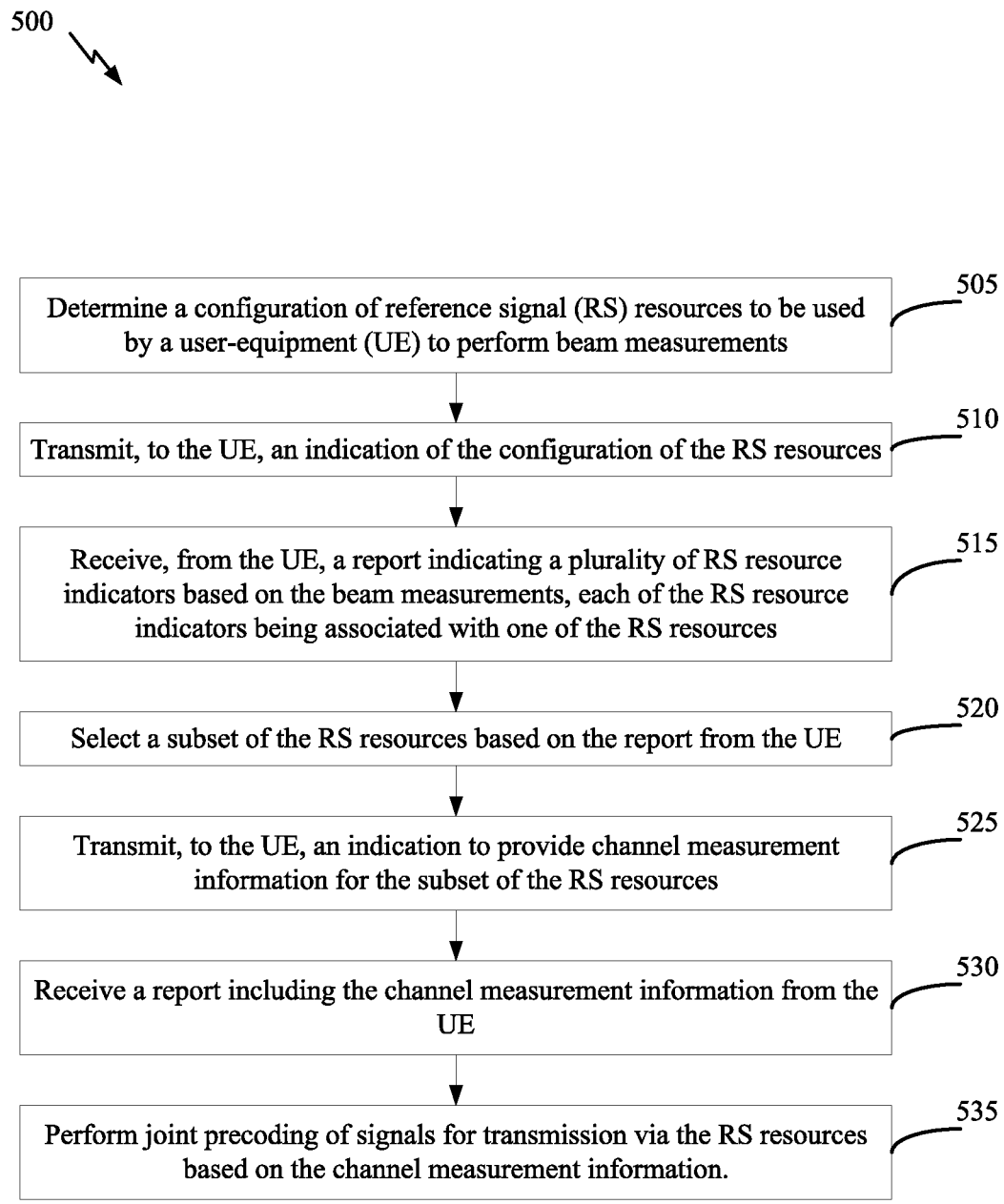
FIG. 5 shows a flowchart illustrating an example process for wireless communication, in accordance with some aspects of the present disclosure.

FIG. 5 shows a flowchart illustrating an example process 500 for wireless communication, in accordance with some aspects of the present disclosure. The operations of the process 500 may be performed, for example, by a BS (for example, such as the BS 110a in the wireless communication network 100).

Process 500 may be implemented as software components that are executed and run on one or more processors (for example, controller/processor 240 of FIG. 2). Further, the transmission and reception of signals by the BS in process 500 may be enabled, for example, by one or more antennas (for example, antennas 234 of FIG. 2). In some aspects, the transmission and/or reception of signals by the BS may be implemented via a bus interface of one or more processors (for example, controller/processor 240) obtaining and/or outputting signals.

The process 500 may begin, in block 505, with the BS determining a configuration of RS resources (for example, CSI-RS resources or SSB resources) to be used by a UE to perform beam measurements, and in block 510, transmitting, to the UE, an indication of the configuration of the RS resources. For example, the BS may configure CSI-RS (or any DL reference signals including SSBs) for the UE to perform beam measurement and provide multiple CRIs per report. The exact number of CRIs to be reported may be a field in an RRC information element (IE).

In some aspects, the BS may, in block 515, receive, from the UE, a report indicating a multiple RS resource indicators (for example, CRIs or SSB-RI) based on the beam measurements, each of the RS resource indicators being associated with one of the RS resources, and in block 520, select a subset of the RS resources based on the report from the UE. For example, the BS may down-select, based on the report from the UE, L CSI-RS resources out of $K_T$ CSI-RS resources. Each of the selected resources may be associated with multiple ports (for example, two ports associated with a horizontal (H)-polarization and a vertical (V)-polarization). In some cases, the UE may select a subset of ports associated with the CSI-RS resources and perform the channel measurement for the subset of ports. For example, the UE may use a criteria such as processing capacity at the UE, remaining power of the UE, or rank, for the selection of the subset of ports.

In block 525, the BS may transmit, to the UE, an indication to provide channel measurement information for the subset of the RS resources. In block 530, the BS may receive a report including the channel measurement information from the UE, and in block 535, perform joint precoding of signals for transmission via the RS resources based on the channel measurement information. For example, the BS may perform joint precoding over the indicated subset of CSI-RS resources and corresponding ports.

Figure 6:
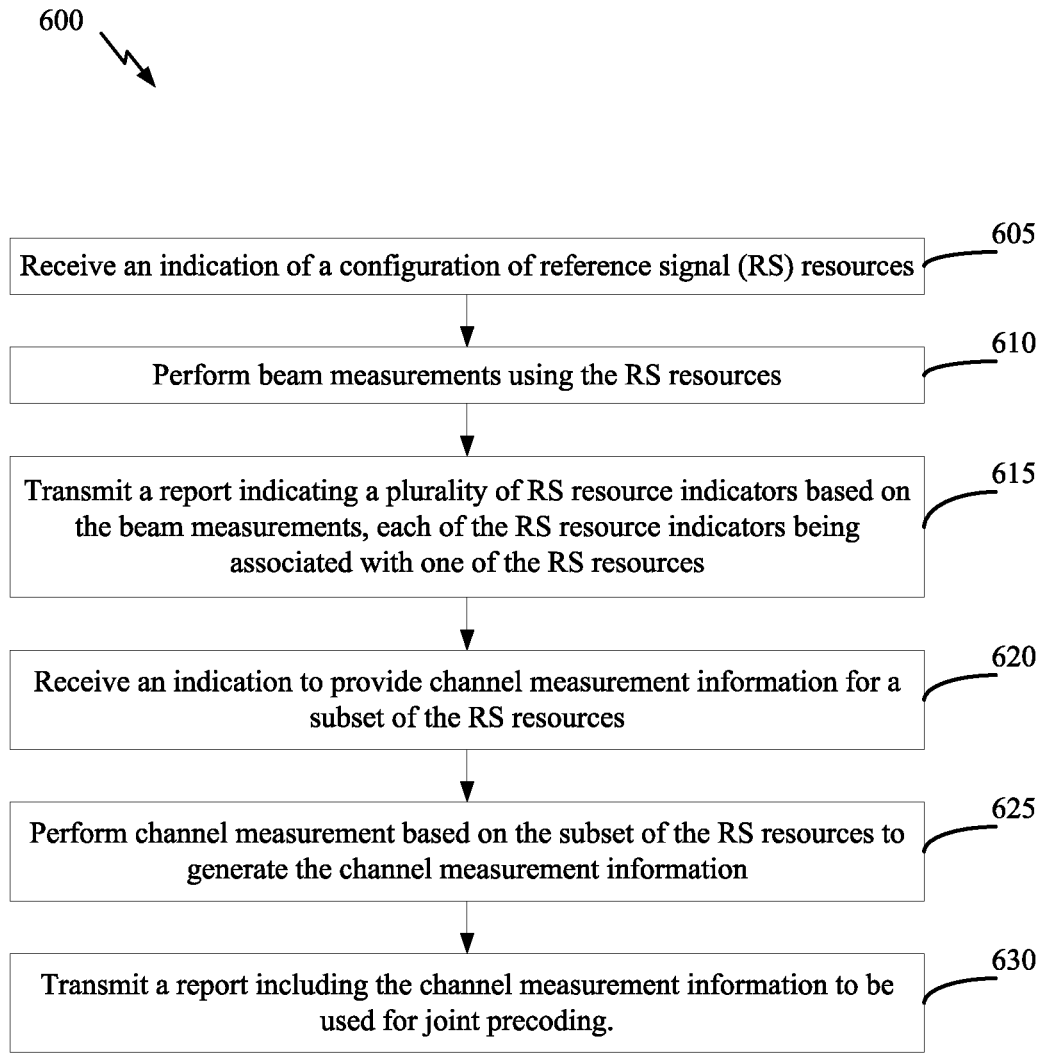
FIG. 6 shows a flowchart illustrating an example process for wireless communication, in accordance with some aspects of the present disclosure.

FIG. 6 shows a flowchart illustrating an example process 600 for wireless communication, in accordance with some aspects of the present disclosure. The operations of the process 600 may be performed, for example, by UE (for example, such as a UE 120a in the wireless communication network 100). The process 600 may be complimentary operations by the UE to the process 500 performed by the BS.

Process 600 may be implemented as software components that are executed and run on one or more processors (for example, controller/processor 280 of FIG. 2). Further, the transmission and reception of signals by the UE in process 600 may be enabled, for example, by one or more antennas (for example, antennas 252 of FIG. 2). In some aspects, the transmission and/or reception of signals by the UE may be implemented via a bus interface of one or more processors (for example, controller/processor 280) obtaining and/or outputting signals.

The process 600 may begin, in block 605, with the UE receiving an indication of a configuration of RS resources, and in block 610, performing beam measurements using the RS resources. In block 615, the UE transmits a report indicating a plurality of RS resource indicators based on the beam measurements, each of the RS resource indicators being associated with one of the RS resources. In block 620, the UE receives an indication to provide channel measurement information for a subset of the RS resources, and in block 625, performs channel measurement based on the subset of the RS resources to generate the channel measurement information. In block 630, the UE transmits a report including the channel measurement information to be used for joint precoding.

As described herein, the exact number of CRIs to be fed back by the UE in a report may be configurable by the BS. The BS, based on the report from the UE, may configure CSI-RS resources for channel measurement to be performed by the UE within a resource set. In some cases, for any codebook type II, the UE may be configured to send only a single CSI-RS report for channel measurement. In some aspects of the present disclosure, the UE may be configured with multiple CSI-RS resources for channel measurement, even for a type II codebook. The BS may select the resources to be used for the channel measurement based on the CSI-RS report that the UE sends. TCI states related to the CSI-RS report may be used as a criteria for the selection of the resources. In other words, the BS may select CSI-RS resources having different type D QCL (for example, spatial filtering parameters), and indicate the CRIs corresponding to the selected CSI-RS resources. The UE may report joint CQI or PMI metrics based on the CRIs indicated by the BS. In some aspects, the UE may use a new enhanced type II codebook to feedback the PMI or CQI, as described in more detail herein.

The enhanced codebook may provide a joint precoding structure for a multi-beam CSI procedure, as described herein. As an example, $K_T$ CSI-RS resources may be available or configured within a resource set. Along with CQI, PMI, and RI, the UE reports $L \leq K_T$ CRIs (for example $cri_1$, $cri_2, \ldots, cri_L$). Each of the CRIs may be associated with two ports (H-polarization and V-polarization per resource). An example enhanced codebook may include:

$$W = W_1 W_2 = \begin{bmatrix} E_{K_T \times L} & 0 \\ 0 & E_{K_T \times L} \end{bmatrix} W_2$$

The precoder matrix W may be represented by a product of a matrix W1 for mapping of ports, and a matrix W2 for amplitude scaling and phase combining. W1 may be used for mapping of $2K_T$ ports associated with the $K_T$ CSI-RS resources, and W2 may be the precoder matrix associated with the selected CSI-RS resource and port combination. The enhanced codebook allows for reusing of an existing Type II codebook for selected CSI-RS resources and ports, while providing enhancements for implementations using more than rank-2 transmission (for example, more than two multiple-input multiple-output (MIMO) streams). In some cases, the l-th column vector of $E_{K_T \times L}$ may be a unit vector $e_l$, having a "1" corresponding to $cri_l$ element, as shown:

$$e_\ell = \begin{bmatrix} 0 \\ \vdots \\ 1 \\ \vdots \\ 0 \end{bmatrix}$$

The l-th column is used to select $cri_l$ element.

As described herein, the BS may perform analog beam selection based on the CRIs reported by the UE. Based on the L resources corresponding to the CRIs reported by the UE, the BS may configure resources for CSI measurement by the UE, and indicate that the UE is to report back PMI, CQI, and RI for the L resources. If the BS configured the UE to perform channel measurement for only one CRI, the UE would feedback the index corresponding to the precoder matrix (W2). But with the BS configuring the UE to feedback multiple CRIs after channel measurement, the UE multiplies the precoder matrix W2 with matrix W1 for mapping of the multiple CRIs and associated ports to precoding parameters, as described herein.

Some aspects provide techniques for mapping of ports to precoding parameters. For example, the BS may apply PMI to a CSI-RS port using a mapping that starts from 3000 to 3000+P−1, where P is the total quantity of ports associated with a CSI-RS resource. For example, for each CSI-RS resource, the mapping may start from port 3000. In some aspects of the present disclosure, CRI for L resources may be reported, and thus, the mapping between CSI-RS port and PMI may result in multiple CSI-RS ports having the same mapping. In some aspects, for a resource indicated by $cri_l$ and corresponding to two ports, the PMI may be applied on the ports starting from $3000+P \times cri_l$ for the first port (for example, H-polarization) and starting from $3000+P \times cri_l+1$ for the second port (for example, V-polarization). In other words, the mapping of ports may be performed as a function CRI, effectively preventing multiple CSI-RS ports to have the same mapping. In general, the mapping for port n of P total ports may be applied from $3000+P \times cri_l+(n-)$, until n is equal to P−1.

In some aspects, there may be $2K_T$ resources, each associated with a single port. For example, the UE may report L resources out of first $K_T$ resources (for example, half of the $2K_T$ resources). In this case, the BS may use the same index in second $K_T$ resources (for example, the other half of the $2K_T$ resources), implicitly. Thus, the UE effectively selects 2L ports from $2K_T$ ports. The corresponding CSI-RS port index mapping may start from $3000+cri_l$, in this case. In some aspects, there may be $K_T$ resources, each associated with a single port. Thus, the UE may report L resources out of the $K_T$ resources. In this case, the enhanced codebook may include:

$$W = W_1 W_2 = E_{K_T \times L} W_2$$

Figure 7:
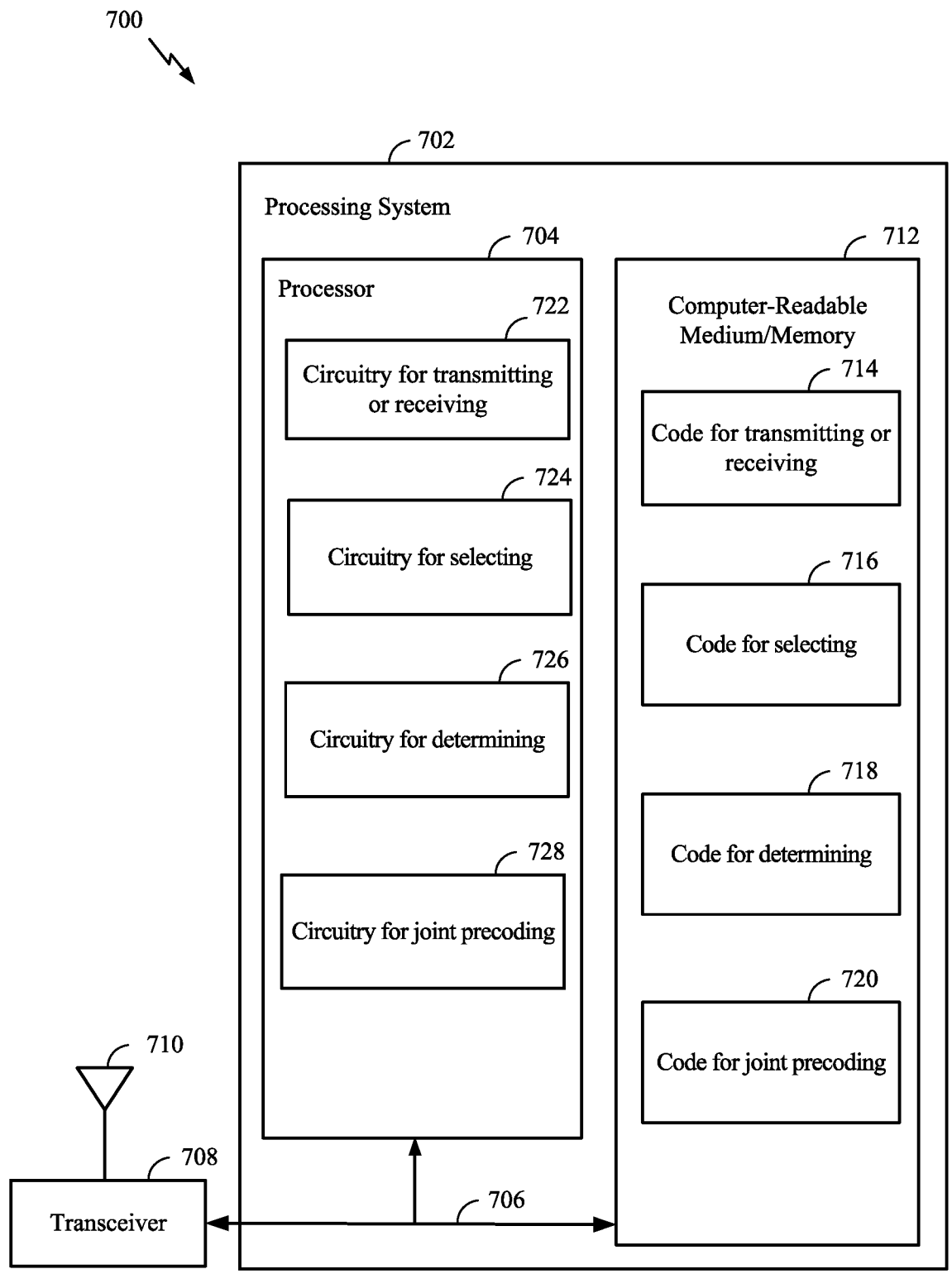
FIG. 7 illustrates a communications device that may include various components of a BS configured to perform operations for the techniques disclosed herein in accordance with aspects of the present disclosure.

FIG. 7 illustrates a communications device 700 that may include various components (for example, corresponding to means-plus-function components) configured to perform operations for the techniques disclosed herein, such as the operations illustrated in FIG. 5. The communications device 700 includes a processing system 702 coupled to a transceiver 708 (for example, a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In some aspects, the computer-readable medium/memory 712 is configured to store instructions (for example, computer-executable code) that when executed by the processor 704, cause the processor 704 to perform the operations illustrated in FIG. 5, or other operations for performing the various techniques discussed herein for joint precoding. In some aspects, computer-readable medium/memory 712 stores code 714 for transmitting or receiving; code 716 for selecting; code 718 for determining; and code 720 for joint precoding. In some aspects, the processor 704 has circuitry configured to implement the code stored in the computer-readable medium/memory 712. The processor 704 includes circuitry 722 for transmitting or receiving; circuitry 724 for selecting; circuitry 726 for determining; and circuitry 728 for joint precoding.

Figure 8:
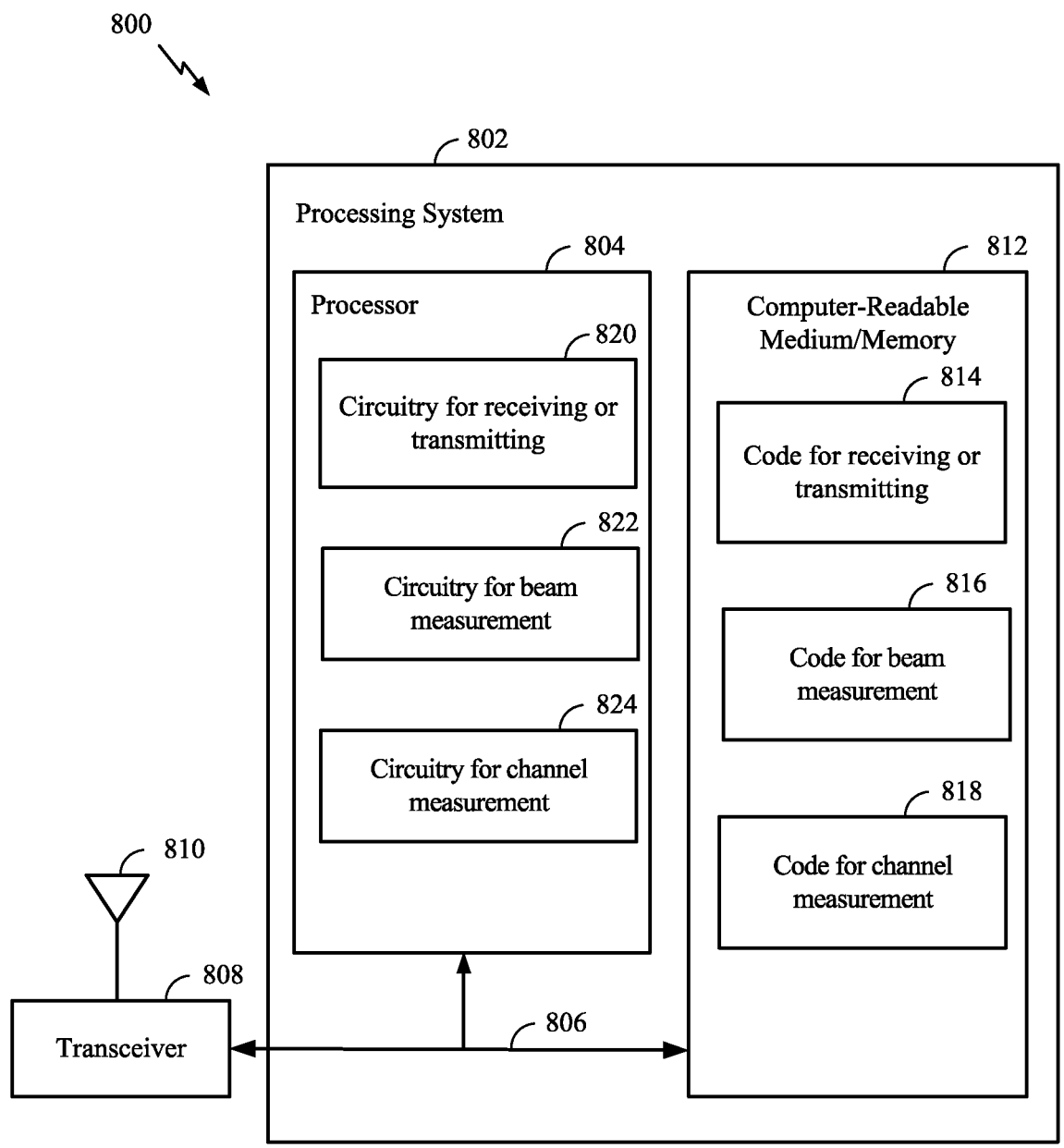
FIG. 8 illustrates a communications device that may include various components of a UE configured to perform operations for the techniques disclosed herein in accordance with aspects of the present disclosure.

FIG. 8 illustrates a communications device 800 that may include various components (for example, corresponding to means-plus-function components) configured to perform operations for the techniques disclosed herein, such as the operations illustrated in FIG. 6. The communications device 800 includes a processing system 802 coupled to a transceiver 808 (for example, a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In some aspects, the computer-readable medium/memory 812 is configured to store instructions (for example, computer-executable code) that when executed by the processor 804, cause the processor 804 to perform the operations illustrated in FIG. 6, or other operations for performing the various techniques discussed herein for joint precoding. In some aspects, computer-readable medium/memory 812 stores code 814 for transmitting or receiving; code 816 for beam measurement; and code 818 for channel measurement. In some aspects, the processor 804 has circuitry configured to implement the code stored in the computer-readable medium/memory 812. The processor 804 includes circuitry 820 for transmitting or receiving; circuitry 822 for beam measurement; and circuitry 824 for channel measurement.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus for wireless communication, comprising:
one or more processors configured to execute instructions stored on one or more memories and to cause the apparatus to:
  determine a configuration of reference signal (RS) resources to be used by a user-equipment (UE) to perform beam measurements;
  transmit, to the UE, an indication of the configuration of the RS resources;
  receive, from the UE, a first report indicating a plurality of RS resource indicators based on the beam measurements, each of the RS resource indicators being associated with one of the RS resources;
  select, based on the first report indicating the plurality of RS resource indicators, a subset of the RS resources for which to receive channel measurement information from the UE;
  transmit, to the UE, an indication to provide the channel measurement information for the selected subset of the RS resources;
  receive, from the UE, a second report including the channel measurement information for the subset of RS resources; and
  perform joint precoding of signals for transmission via the RS resources based on the channel measurement information.

2. The apparatus of claim 1, wherein the RS resources comprise channel state information (CSI)-RS (CSI-RS) resources or synchronization signal block (SSB) resources.

3. The apparatus of claim 1, wherein the RS resource indicators comprises CSI-RS resource indicators (CRIs) or SSB-resource indicators (SSB-RIs).

4. The apparatus of claim 1, wherein the one or more processors are further configured to cause the apparatus to transmit, to the UE, an indication of a quantity of the plurality of RS resource indicators to be reported.

5. The apparatus of claim 1, wherein the plurality of RS resource indicators correspond to the RS resources the UE is able to receive simultaneously.

6. The apparatus of claim 1, wherein:
each of the RS resources is associated with one or more ports, and
the report indicating the channel measurement information comprises a product of a precoder matrix and a matrix for selection of the one or more ports for each of the RS resources.

7. The apparatus of claim 6, wherein the one or more ports comprise a plurality of ports.

8. The apparatus of claim 6, wherein the one or more ports comprise a single port.

9. The apparatus of claim 1, wherein:
each of the RS resources is associated with a plurality of ports, and
the channel measurement information is provided for each of at least a subset of the plurality of ports.

10. The apparatus of claim 9, wherein:
each of the RS resources is associated with a first port and a second port of the plurality of ports;
a mapping of each of the first ports to parameters of the channel measurement information is based on a function of the RS resource indicator associated with the first port; and
a mapping of each of the second ports to parameters of the channel measurement information is based on a function of the RS resource indicator associated with the second port.

11. The apparatus of claim 10, wherein:
the mapping of each of the first ports is based on a total quantity of the plurality of ports and an index of the RS resource associated with the first port; and
the mapping of each of the second ports is based on the total quantity of the plurality of ports and an index of the RS resource associated with the second port incremented by one.

12. The apparatus of claim 10, wherein the first port is associated with horizontal polarization and the second port is associated with vertical polarization.

13. The apparatus of claim 1, wherein each of the RS resources is associated with a single respective port.

14. The apparatus of claim 13, wherein a mapping of each of the ports to parameters of the channel measurement information is based on a function of the RS resource indicator associated with the port.

15. The apparatus of claim 1, wherein the channel measurement information comprises at least one of channel quality information (CQI), a pre-coding matrix indicator (PMI), or a rank indicator (RI).

16. The apparatus of claim 1, wherein transmission configuration indicator (TCI) states for each of the RS resources is associated with a corresponding one of the RS resources reported by the UE.

17. The apparatus of claim 1, wherein a spatial quasi-co location (QCL) of each of the RS resources is different.

18. An apparatus for wireless communication, comprising:
one or more processors configured to execute instructions stored on one or more memories and to cause the apparatus to:
receive, from a network entity, an indication of a configuration of reference signal (RS) resources;
perform beam measurements using the RS resources;
transmit, to the network entity, a first report indicating a plurality of RS resource indicators based on the beam measurements, each of the RS resource indicators being associated with one of the RS resources;

receive, from the network entity, an indication to provide channel measurement information for a subset of the RS resources selected at the network entity based on the first report indicating the plurality of RS resource indicators;
perform channel measurements based on the subset of the RS resources to generate the channel measurement information; and
transmit, to the network entity, a second report including the channel measurement information for the subset of RS resources to be used for joint precoding.

19. The apparatus of claim 18, wherein the RS resources comprise channel state information (CSI)-RS (CSI-RS) resources or synchronization signal block (SSB) resources.

20. The apparatus of claim 18, wherein the RS resource indicators comprises CSI-RS resource indicators (CRIs) or SSB resource indicators (SSB-RIs).

21. The apparatus of claim 18, further comprising receiving an indication of a quantity of the plurality of RS resource indicators to be reported.

22. The apparatus of claim 18, wherein the plurality of RS resource indicators correspond to the RS resources the apparatus is able to receive simultaneously.

23. The apparatus of claim 18, wherein each of the RS resources is associated with one or more ports, and wherein the report indicating the channel measurement information comprises a product of a precoder matrix and a matrix for selection of the one or more ports for each of the RS resources.

24. The apparatus of claim 23, wherein the one or more ports comprise a plurality of ports.

25. The apparatus of claim 23, wherein the one or more ports comprise a single port.

26. The apparatus of claim 18, wherein each of the RS resources is associated with a plurality of ports, and wherein the channel measurement information is provided for each of at least a subset of the plurality of ports.

27. The apparatus of claim 26, wherein:
each of the RS resources is associated with a first port and a second port of the plurality of ports;
a mapping of each of the first ports to parameters of the channel measurement information is based on a function of the RS resource indicator associated with the first port; and
a mapping of each of the second ports to parameters of the channel measurement information is based on a function of the RS resource indicator associated with the second port.

28. The apparatus of claim 27, wherein:
the mapping of each of the first ports is based on a total quantity of the plurality of ports and an index of the RS resource associated with the first port; and
the mapping of each of the second ports is based on the total quantity of the plurality of ports and an index of the RS resource associated with the second port incremented by one.

29. The apparatus of claim 27, wherein the first port is associated with horizontal polarization and the second port is associated with vertical polarization.

30. The apparatus of claim 18, wherein each of the RS resources is associated with a single respective port.

31. The apparatus of claim 30, wherein a mapping of each of the ports to parameters of the channel measurement information is based on a function of the RS resource indicator associated with the port.

32. The apparatus of claim 18, wherein the channel measurement information comprises at least one of channel quality information (CQI), a pre-coding matrix indicator (PMI), or a rank indicator (RI).

33. The apparatus of claim 18, wherein transmission configuration indicator (TCI) states for each of the RS resources is associated with a corresponding one of the RS resources reported by the apparatus.

34. The apparatus of claim 18, wherein a spatial quasi-co location (QCL) of each of the RS resources is different.

35. A method for wireless communication, comprising:
determining, at a network entity, a configuration of reference signal (RS) resources to be used by a user-equipment (UE) to perform beam measurements;
transmitting, from the network entity to the UE, an indication of the configuration of the RS resources;
receiving, at the network entity from the UE, a first report indicating a plurality of RS resource indicators based on the beam measurements, each of the RS resource indicators being associated with one of the RS resources;
selecting, at the network entity based on the first report indicating the plurality of RS resource indicators, a subset of the RS resources for which to receive channel measurement information from the UE;
transmitting, from the network entity to the UE, an indication to provide the channel measurement information for the selected subset of the RS resources;
receiving, at the network entity from the UE, a second report including the channel measurement information for the subset of RS resources; and
performing, at the network entity, joint precoding of signals for transmission via the RS resources based on the channel measurement information.

36. A method for wireless communication by a user equipment (UE), comprising:
receiving, from a network entity, an indication of a configuration of reference signal (RS) resources;
performing, at the UE, beam measurements using the RS resources;
transmitting, from the UE to the network entity, a first report indicating a plurality of RS resource indicators based on the beam measurements, each of the RS resource indicators being associated with one of the RS resources;
receiving, from a network entity, an indication to provide channel measurement information for a subset of the RS resources selected at the network entity based on the first report indicating the plurality of RS resource indicators;
performing, at the UE, channel measurements based on the subset of the RS resources to generate the channel measurement information; and
transmitting, from the UE to the network entity, a second report including the channel measurement information for the subset of RS resources to be used for joint precoding.

37. An apparatus for wireless communication, comprising:
means for determining, at a network entity, a configuration of reference signal (RS) resources to be used by a user-equipment (UE) to perform beam measurements;
means for transmitting, from the network entity to the UE, an indication of the configuration of the RS resources;
means for receiving, at the network entity from the UE, a first report indicating a plurality of RS resource indicators based on the beam measurements, each of the RS resource indicators being associated with one of the RS resources;

means for selecting, at the network entity based on the first report indicating the plurality of RS resource indicators, a subset of the RS resources;

means for transmitting, from the network entity to the UE, an indication to provide the channel measurement information for the subset of the RS resources;

means for receiving, at the network entity from the UE, a second report including the channel measurement information for the selected subset of RS resources; and means for performing, at the network entity, joint precoding of signals for transmission via the RS resources based on the channel measurement information.

38. An apparatus for wireless communication by a user-equipment (UE), comprising:

means for receiving, at the UE from a network entity, an indication of a configuration of reference signal (RS) resources;

means for performing, at the UE, beam measurements using the RS resources;

means for transmitting, from the UE to the network entity, a first report indicating a plurality of RS resource indicators based on the beam measurements, each of the RS resource indicators being associated with one of the RS resources;

means for receiving, at the UE from the network entity, an indication to provide channel measurement information for a subset of the RS resources selected based on the first report indicating the plurality of RS resource indicators;

means for performing, at the UE, channel measurement based on the subset of the RS resources to generate the channel measurement information; and means for transmitting, from the UE to the network entity, a second report including the channel measurement information for the subset of RS resources to be used for joint precoding.

* * * * *